(12) United States Patent
Tabanelli et al.

(10) Patent No.: US 10,040,212 B2
(45) Date of Patent: Aug. 7, 2018

(54) APPARATUS AND METHOD FOR CUTTING PIPES OF THERMOPLASTIC MATERIAL

(71) Applicant: SICA S.P.A., Alfonsine (Ravenna) (IT)

(72) Inventors: Giorgio Tabanelli, Cotignola (IT); Marco Gulminelli, Lavezzola (IT)

(73) Assignee: SICA S.P.A., Alfonsine (IT)

( * ) Notice: Subject to any disclaimer, the term of this patent is extended or adjusted under 35 U.S.C. 154(b) by 59 days.

(21) Appl. No.: 14/650,414

(22) PCT Filed: Dec. 18, 2013

(86) PCT No.: PCT/IB2013/061096
§ 371 (c)(1),
(2) Date: Jun. 8, 2015

(87) PCT Pub. No.: WO2014/097182
PCT Pub. Date: Jun. 26, 2014

(65) Prior Publication Data
US 2015/0306780 A1    Oct. 29, 2015

(30) Foreign Application Priority Data
Dec. 20, 2012   (IT) .............................. RN2012A0058

(51) Int. Cl.
*B26D 3/16*     (2006.01)
*B26D 7/08*     (2006.01)
(Continued)

(52) U.S. Cl.
CPC ............. *B26D 7/088* (2013.01); *B23D 21/04* (2013.01); *B23D 45/126* (2013.01); *B23D 59/02* (2013.01); *B26D 1/16* (2013.01); *B26D 3/16* (2013.01)

(58) Field of Classification Search
CPC .. B26D 1/16; B26D 3/16; B26D 7/088; Y10T 83/0591; Y10T 83/2066; Y10T 83/263;
(Continued)

(56) References Cited

U.S. PATENT DOCUMENTS 1,958,912 A * 5/1934 Clark ..................... B26D 7/088
                                                    30/123.3
3,135,304 A * 6/1964 Breer ........................ B27B 5/14
                                                    30/276
(Continued)

FOREIGN PATENT DOCUMENTS

DE    202 15 642 U1    2/2003
EP      0 982 104 A2   3/2000
EP      1 510 317 A1   3/2005

*Primary Examiner* — Kenneth E Peterson
*Assistant Examiner* — Liang Dong
(74) *Attorney, Agent, or Firm* — Pearne & Gordon LLP (57) ABSTRACT

An apparatus (1) for cutting a pipe (2) made of thermoplastic material including: a cutting unit (T) which includes a tool equipped with a disk (3) rotatable about an axis (XI) and which are used to allow a rotary motion of the axis (XI) of the disk (3) about an axis (X2) of the pipe (2) and disk (3) sinking into the pipe (2) in a radial direction; a lubricant dispensing unit (L) for the disk (3), used to operate on at least one portion (P1,P2) of a face (F1,F2) of the disk (3), for releasing a predetermined quantity of lubricant on it so as to reduce the friction between the disk (3) and the pipe (2) during cutting.

11 Claims, 12 Drawing Sheets

(51) Int. Cl.
  *B23D 45/12* (2006.01)
  *B23D 21/04* (2006.01)
  *B23D 59/02* (2006.01)
  *B26D 1/16* (2006.01)

(58) Field of Classification Search
  CPC ............... Y10T 82/364; Y10T 83/7139; Y10T 83/7258; B23D 21/04; B23D 45/126; B23D 59/02
  See application file for complete search history.

(56) References Cited

U.S. PATENT DOCUMENTS

| | | | |
|---|---|---|---|
| 3,661,045 A * | 5/1972 | Mermelstein | B23D 47/005 83/169 |
| 4,794,832 A | 1/1989 | Trimble | |
| 5,953,974 A * | 9/1999 | Hegler | B23D 45/027 279/106 |
| 6,009,780 A * | 1/2000 | Savioli | B23D 21/04 82/53.1 |
| 2005/0046069 A1 | 3/2005 | Sasabe et al. | |

\* cited by examiner

APPARATUS AND METHOD FOR CUTTING PIPES OF THERMOPLASTIC MATERIAL

TECHNICAL FIELD

This invention relates to an apparatus and a method for cutting pipes of thermoplastic material such as polyethylene or random polypropylene (semi-crystalline thermoplastic materials).

The invention addresses the technical field relating to the cutting of pipes made of thermoplastic material such as polyethylene or random polypropylene and, in particular, the technical field relating to the cutting of pipes with large diameters and very thick walls.

BACKGROUND ART

Polyethylene or random polypropylene pipes of this kind are used mainly for the distribution of gas and drinking water in particular in civil and industrial installations.

Polyethylene or random polypropylene pipes are made in continuous extrusion lines.

In this production line, the material in the plastic state is fed by a screw which rotates inside a cylinder and forces the material through a die of suitable shape and size giving the material the required circular shape.

The pipe production installation, that is to say, the extrusion line, normally comprises a sequence of machines, each with specific functions.

One of these machines, located at the end of the extrusion line, is a cutting device designed to cut the pipe into lengths of precise, predetermined size.

The cutting device is usually an automatic machine tool, known as "cutter", capable of cutting the pipe as it moves in a straight line at a constant speed.

The cutter comprises a mechanical unit, known as cutting unit, which imparts the working motion to the cutting tool.

The cutting unit is installed on a carriage which moves in synchrony with the pipe during the cutting operation.

The carriage has a pair of vices designed to clamp the pipe in place, During the cutting operation, these vices clamp the pipe upstream and downstream of the separating plane (known as the cutting plane) of the length of extruded pipe.

In the relevant field of cutting polyethylene or random polypropylene pipes having large diameters and thick walls, cutters equipped with sawtooth cutting tools may be used which perform cutting by removal of material.

As is known, removal of material produces swarf which must be extracted because it obstructs the cutting zone, preventing the cutter from operating properly.

Moreover, the swarf produced during cutting contaminates the working environment and may damage other devices forming part of the cutting unit and may make it difficult or impossible to perform subsequent operations such as sealing the ends of the pipes to each other or to end fitting joints.

A further disadvantage of cutters of this type is that they are noisy and produce vibrations which are transmitted to the working parts and frame of the cutter itself.

Another type of cutter for pipes made of thermoplastic material comprises circular disk knives which rotate freely about their axes.

The disk is driven in rotation about the axis of the pipe.

This type of cutter overcomes the above mentioned disadvantage of swarf because cutting is accomplished by separation, It has been found, however, that the larger the diameter and the thicker the walls of the pipe to be cut, the higher the torque required to drive the disk in rotation about the axis of the pipe.

Thus, for a pipe with a particularly large diameter and a very thick wall the torque required to drive the disk in rotation about the axis of the pipe is extremely high.

It has also been found that the forces generated by contact between the disk knife and the pipe walls during cutting are particularly high and cause rapid disk wear.

A need that is therefore felt particularly strongly by operators in this sector is that for a cutting machine which allows cutting pipes made of thermoplastic material, in particular, semi-crystalline thermoplastic material such as polyethylene or random polypropylene and which does not suffer from the above mentioned disadvantages.

DISCLOSURE OF THE INVENTION

The aim of this invention is to meet the above mentioned need, that is to say, to provide a machine and a method which allow cutting pipes made of thermoplastic material, in particular, semi-crystalline thermoplastic material (such as polyethylene or random polypropylene) and which do not suffer from the above described disadvantages.

In accordance with the invention, this aim is achieved by a cutting apparatus and a cutting method comprising the technical features described in one or more of the annexed claims.

BRIEF DESCRIPTION OF THE DRAWINGS

The technical features of the invention, with reference to the above aims, are clearly described in the claims below and its advantages are more apparent from the detailed description which follows, with reference to the accompanying drawings which illustrate a preferred, no-limiting example embodiment of it, and in which:

DETAILED DESCRIPTION OF PREFERRED EMBODIMENTS OF THE INVENTION

With reference to the accompanying drawings, the numeral 1 denotes an apparatus for cutting a pipe 2 made of thermoplastic material.

The cutting apparatus 1 can advantageously be used for cutting pipes 2 made of thermoplastic material, preferably pipes 2 made of semi-crystalline thermoplastic material.

Still more preferably, the cutting apparatus 1 can advantageously be used for cutting pipes 2 made of polyethylene (PE) and random polypropylene (PP-R).

The apparatus 1 is, also, particularly suitable for cutting pipes 2 of very large diameter (greater than 80 cm) and very thick walls (greater than 9 cm).

The apparatus 1 comprises cutting means T which have a tool equipped with a disk 3 rotatable about an axis X1 and which are configured to allow the axis X1 of the disk 3 to rotate about an axis X2 of the pipe 2 and to allow the selfsame disk 3 to sink into the pipe 2 in a radial direction.

Preferably, the disk 3 can rotate freely about its own axis X1, that is to say, it is an idle disk.

It should be noted that the combination of the rotational motion of the axis X1 of the disk 3 about an axis X2 of the pipe 2 and the sinking (movement) of the disk 3 radially into the wall of the pipe 2 causes the resulting motion of the disk 3 to be a substantially spiral motion.

More specifically, the axis X1 of the disk 3 is parallel to the axis X2 of the pipe 2 being cut.

It should be noted that the disk 3 is carried by a first arm 10.

More specifically, the disk 3 is connected to a free end of the arm 10. The first arm 10 is rotatably connected (by a hinge) to a supporting frame 7. More specifically, the first arm 10 is hinged to the frame 7 at the point labelled 110.

Thus, the first arm 10 is rotatable relative to the supporting frame 7.

Preferably, the first arm 10 is driven to rotate relative to the supporting frame 7 by an actuator (preferably hydraulic).

The supporting frame 7 thus carries the cutting means T.

The supporting frame 7 preferably has an annular shape.

It should be noted that the supporting frame 7 is configured to be driven to rotate about the axis X2 of the pipe 2 so as to allow the rotary motion of the axis X1 of the disk 3 about the axis X2 of the pipe 2.

The apparatus 1 also comprises actuator means A2 for driving the supporting frame 7 in the rotation relative to the axis X2 of the pipe 2.

The actuator means A2 preferably comprise a motor coupled to the supporting frame 7 to drive the frame 7 in rotation relative to the axis X2 of the pipe 2.

The frame 7 is supported, relative to a mounting structure, by a plurality of rotary elements (R1-R4).

The rotary elements (R1-R4) engage the outer periphery of the annular supporting frame 7 to allow the frame 7 to rotate about its own axis (which coincides with the axis X2 of the pipe).

More specifically, in the embodiment illustrated, the actuator means A2 are coupled to one of the rotary elements R1-R4 (in the case illustrated, the means A2 are coupled to the rotary element R2), to drive it in rotation, thereby causing the frame 7 to rotate.

The apparatus 1 further comprises a device I1 for opposing the pipe 2.

The device I1 for opposing the pipe 2 comprises a rotary element 12.

The rotary element 12 is substantially cylindrical in shape.

The device I1 for opposing the pipe 2 prevents deflection of the pipe 2 while it is being cut.

In effect, the rotary element 12 and the disk 3 are located relative to each other in such a way as to operate on the pipe 2 from opposite positions (preferably at 180° from each other) relative to the axis X2 of the pipe 2.

The rotary element 12 is carried by the supporting frame 7.

More specifically, the rotary element 12 is connected to the supporting frame 7.

The rotary element 12 is carried by a second arm 11 which is hinged (rotatably connected by a hinge) to the supporting frame 7.

According to the invention, the apparatus 1 also comprises lubricating means L for the disk (3), configured to operate on at least one portion (P1, P2)—not in contact with the wall of the pipe 2—of a face (F1, F2) of the disk 3, for releasing a predetermined quantity of lubricant on it so as to reduce the friction between the disk 3 and the pipe 2 when the portion (P1,P2) next comes into contact with the wall of the pipe 2 to be cut (that is, during cutting).

It should be noted that the predetermined quantity of lubricant is a quantity of lubricant such as to prevent dripping of the lubricant on the pipe 2, which would inevitably contaminate the pipe and would cause the problems described above with reference to the prior art.

Preferably, the lubricating means L are configured to release the predetermined quantity of lubricant on a radial portion (zone) of the disk 3 so as to lubricate the entire surface of the disk 3 while the disk 3 rotates.

This radial portion is therefore a radial area of the disk 3 which instantaneously receives the lubricant: as the disk 3 rotates, this radial area covers different zones of the disk.

Preferably, the lubricating means L comprise means E for supplying a fluid lubricant.

Preferably, the fluid lubricant is a lubricating oil.

It should be noted that the lubricating means L are configured to apply a film of lubricant on the portion (P1,P2) of the face (F1,F2) of the disk 3. The film is such that the fluid lubricant is prevented from dripping onto the pipe 2.

In the embodiment illustrated in the accompanying drawings, the lubricating means L comprise first distribution units L1, operating on at least one portion of a first face F1 of the disk 3 for lubricating it, and second distribution units L2, operating on at least one portion of a second face F2 of the disk 3, which is opposite to the first face F1, for lubricating it.

The first distribution units L1 and the second distribution units L2 each comprise a distribution element (5A,5B).

In the embodiment illustrated, the distribution element (5A,5B) is configured to distribute liquid lubricant while the disk 3 is moving.

Figure 7:
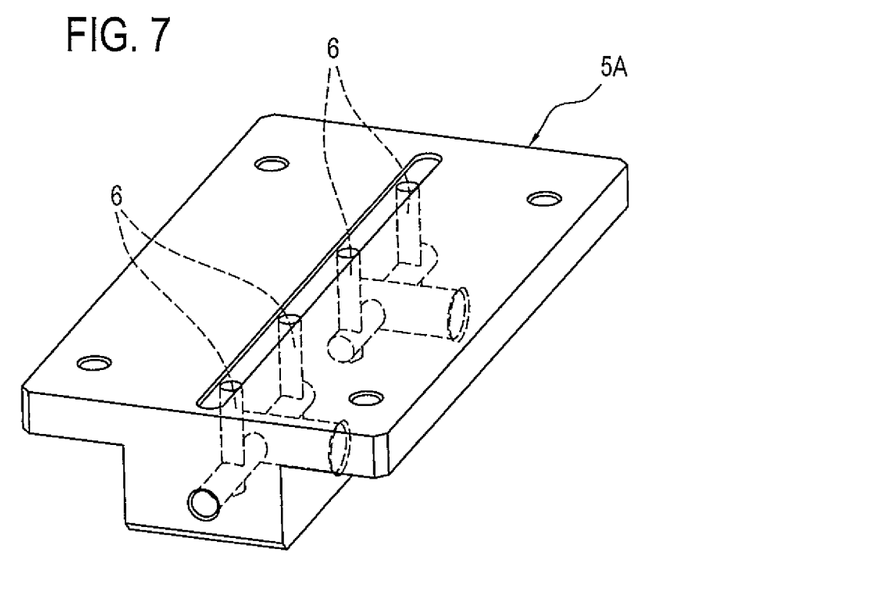
Figure 8:
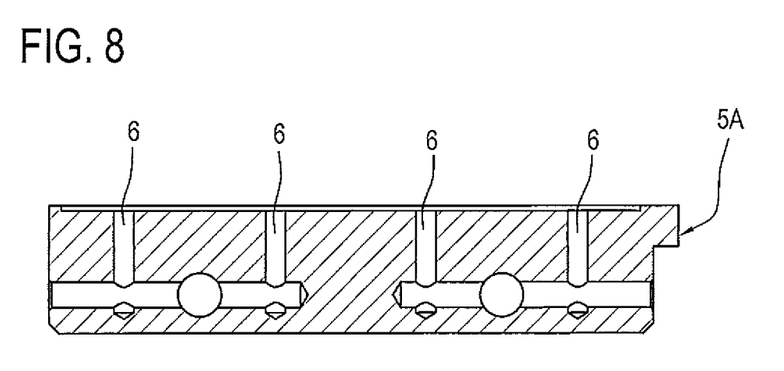
Figure 9:
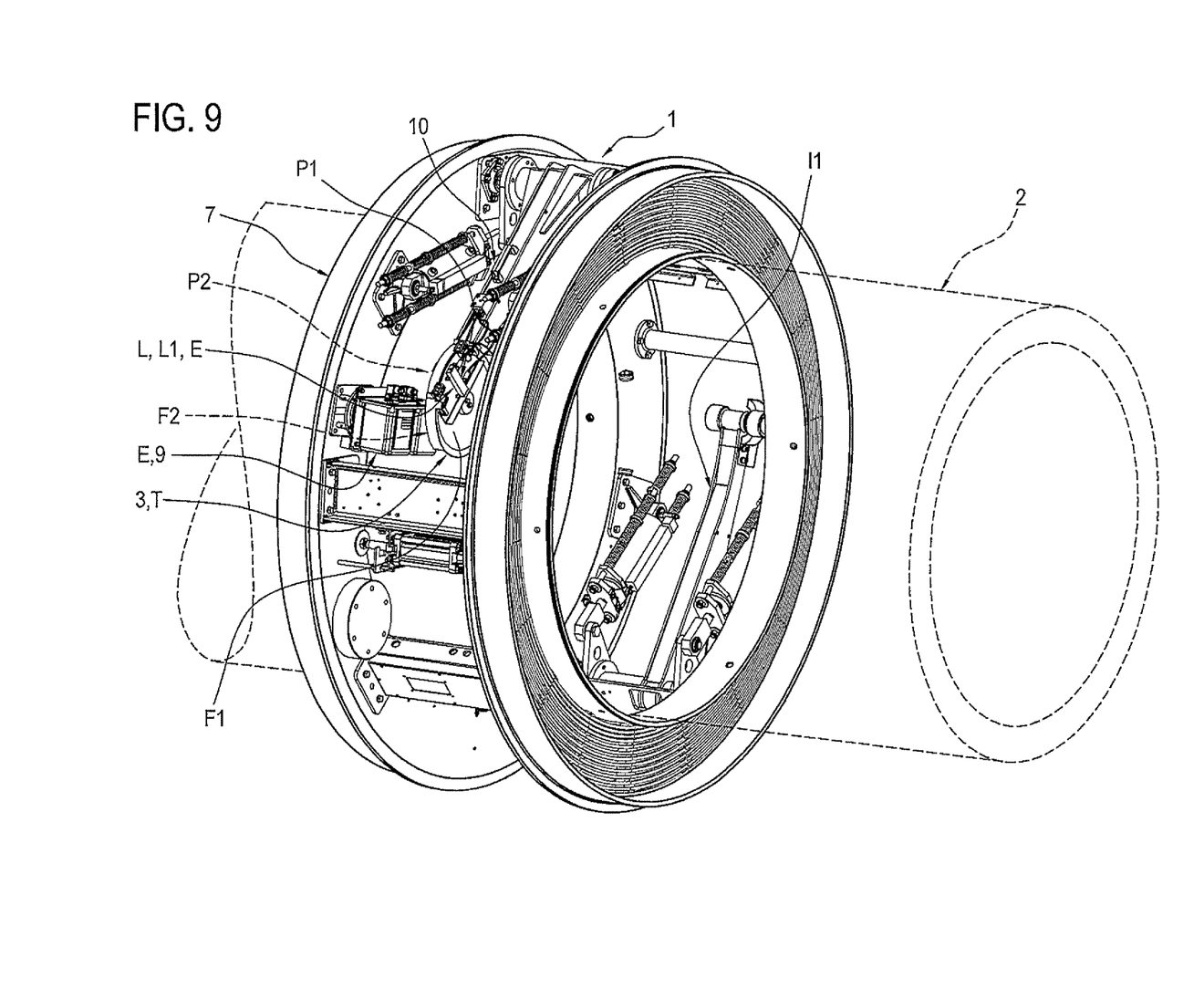
FIG. 9 is a perspective view of the cutting apparatus with some parts cut away to better illustrate others.
Figure 10:
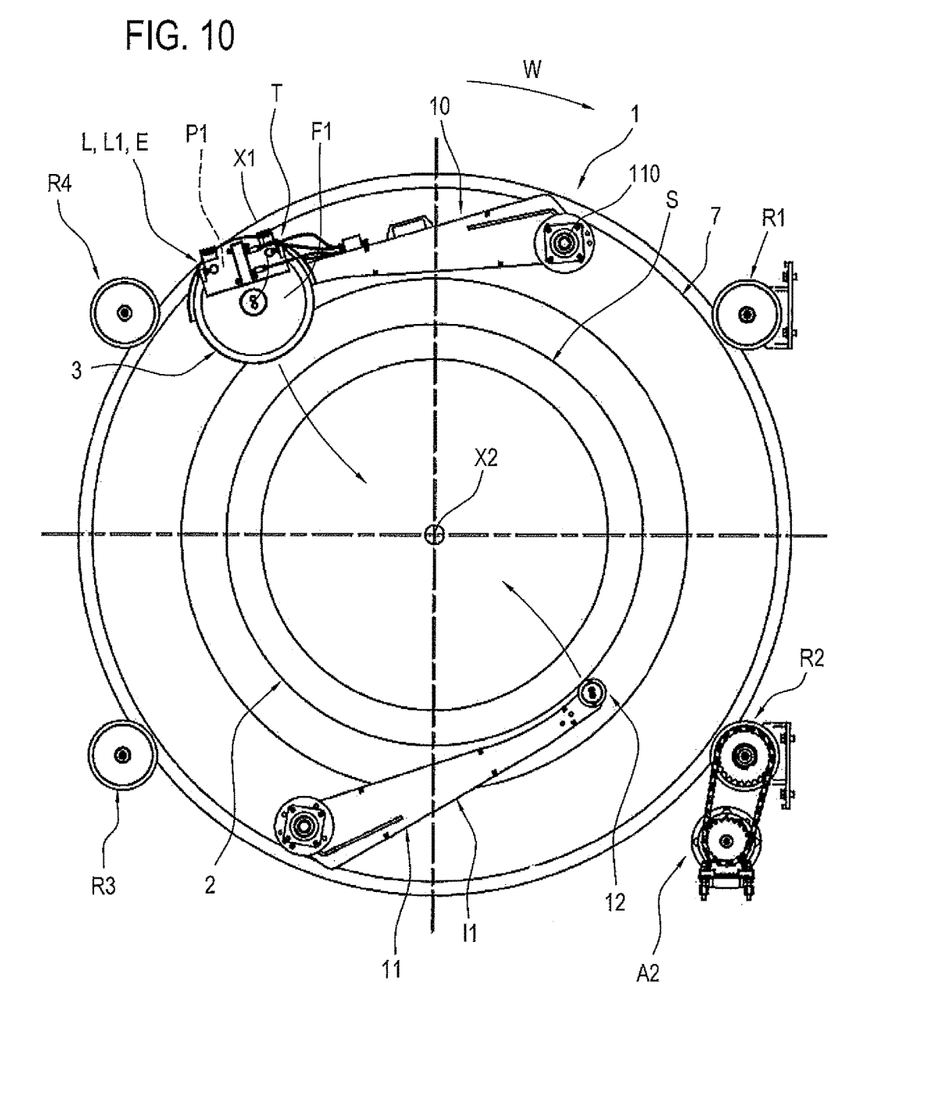
FIGS. 10 to 13 schematically illustrate the cutting apparatus in respective operating configurations.
Figure 11:
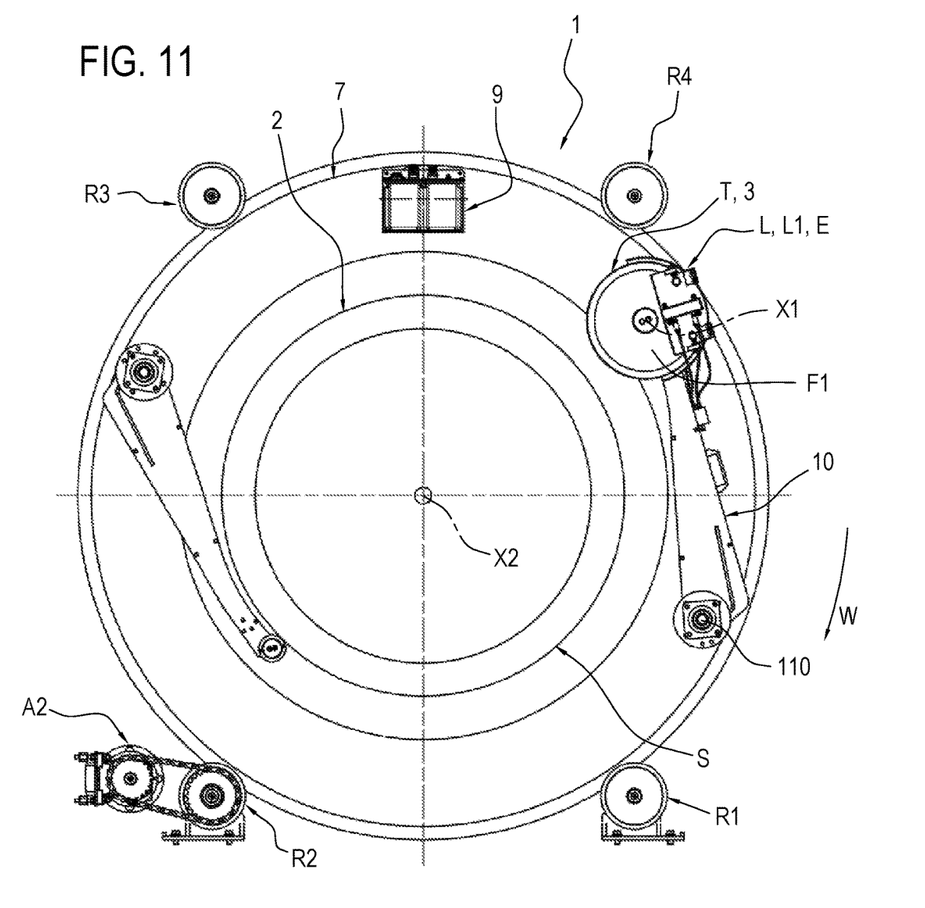
Figure 12:
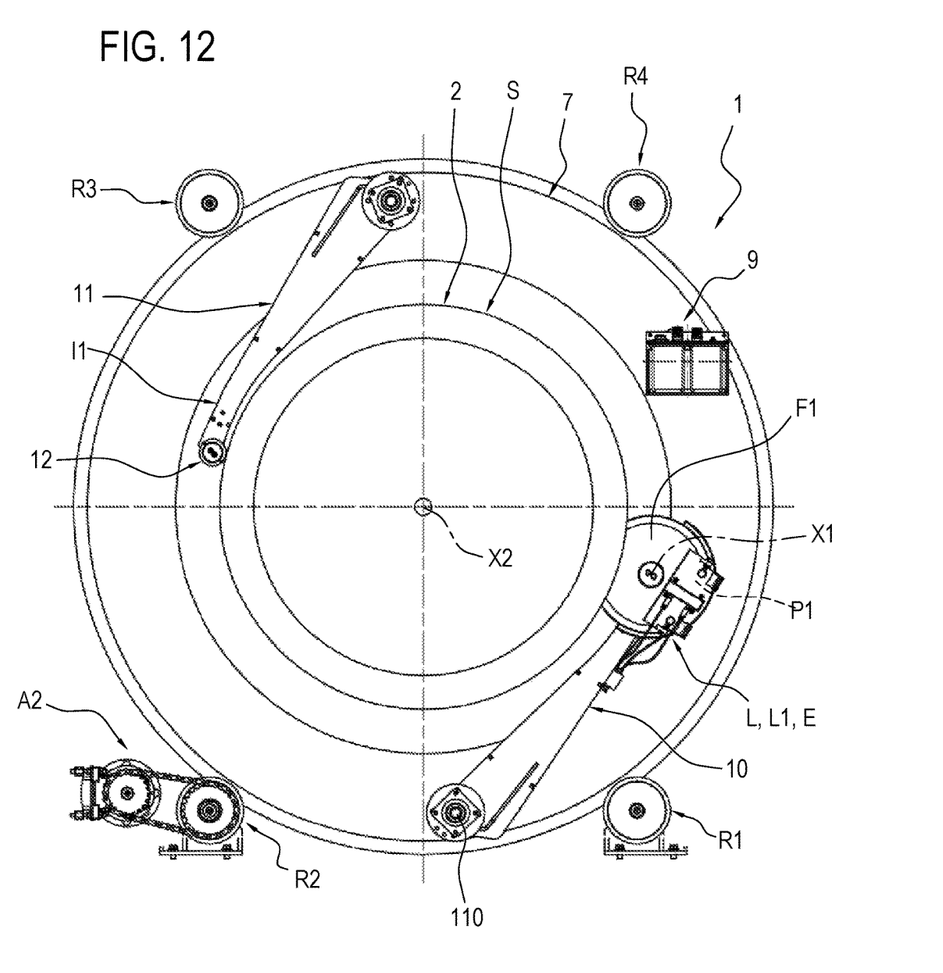
Figure 13:
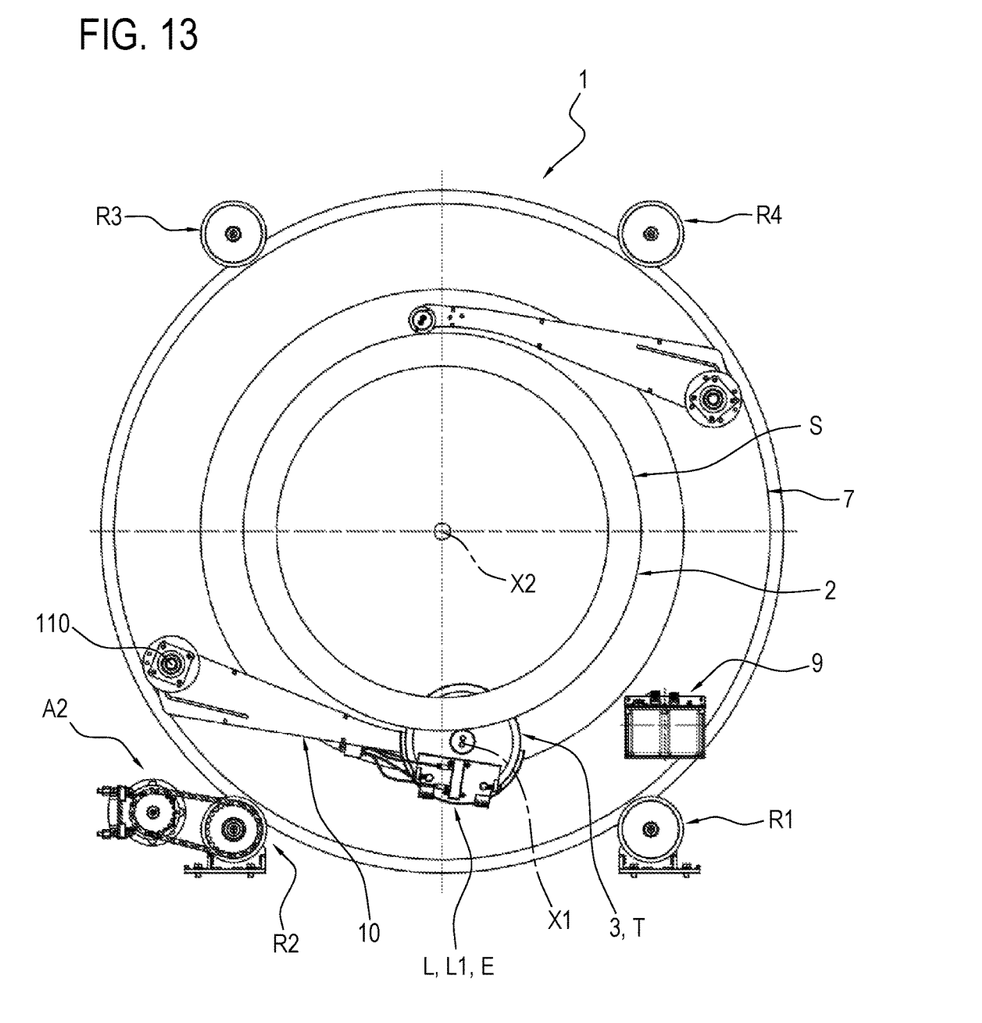

FIGS. 7 and 8 illustrate a distribution element 5A.

It should be noted that the distribution element 5A comprises a plurality of channels 6 for distributing the lubricant and which are configured to allow the lubricant to be distributed substantially uniformly on the portion (P1,P2) of at least one face (F1,F2) of the disk 3.

As explained below, the distribution channels 6 are connected to a source of fluid lubricant.

It should be noted that, preferably, but not necessarily, each distribution element (5A,5B) is covered by a layer of felt 13A,13B (or in more general terms, by a material having hygroscopic properties).

More generally speaking, the layer of felt 13A,13B constitutes an absorbing element 13A,13B.

The absorbing element 13A,13B having hygroscopic properties is in direct contact with the disk 3 so as to release fluid lubricant thereon during cutting.

In the embodiment illustrated, the absorbing element (13A,13B) is thus configured to absorb fluid lubricant and to come into contact with the portion (P1, P2) of the face (F1, F2) of the disk 3 so as to transfer the fluid lubricant to the disk 3 as the disk 3 moves.

In the embodiment illustrated in the accompanying drawings, the first distribution units L1 and the second distribution units L2 are associated with a box-shaped container 4.

The box-shaped container 4 has a first shell 15A and a second half shell 15B which are coupled (hinged) to each other.

The box-shaped container 4 is connected, that is, fixed, to the first arm 10. More generally speaking, the box-shaped container 4 constitutes means C for coupling the distribution units (L1,L2) to the cutting means T and which are configured to allow the distribution units (L1,L2) to be in contact with the cutting means T so as to release lubricant on the portion (P1,P2) of the faces (F1,F2) of the disk 3.

In the embodiment illustrated, the apparatus 1 comprises means E for supplying the fluid lubricant.

Figure 1:
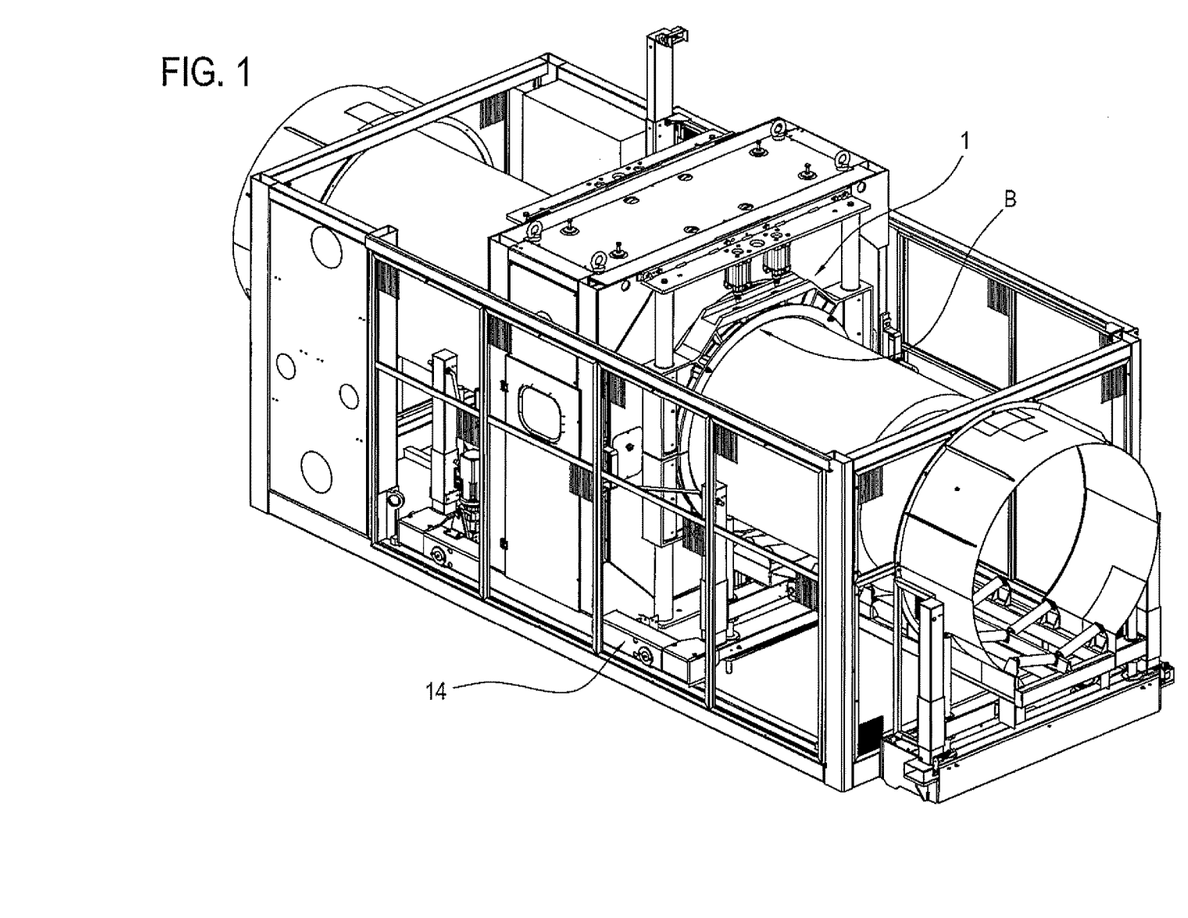
FIG. 1 is a perspective view of the cutting apparatus of this invention.
Figure 2:
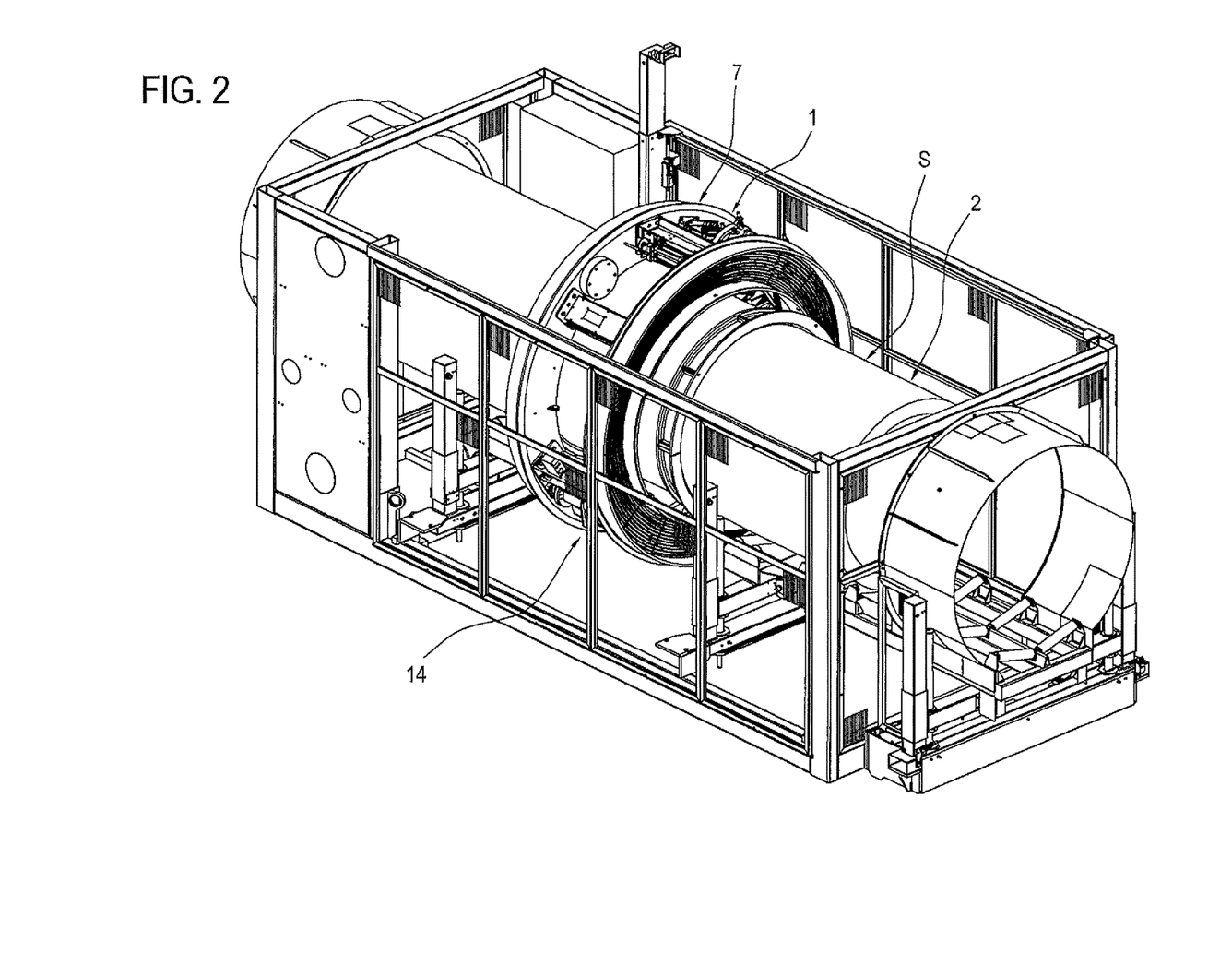
FIG. 2 is a perspective view of the cutting apparatus of FIG. 1 with some parts cut away to better illustrate others.
Figure 3:
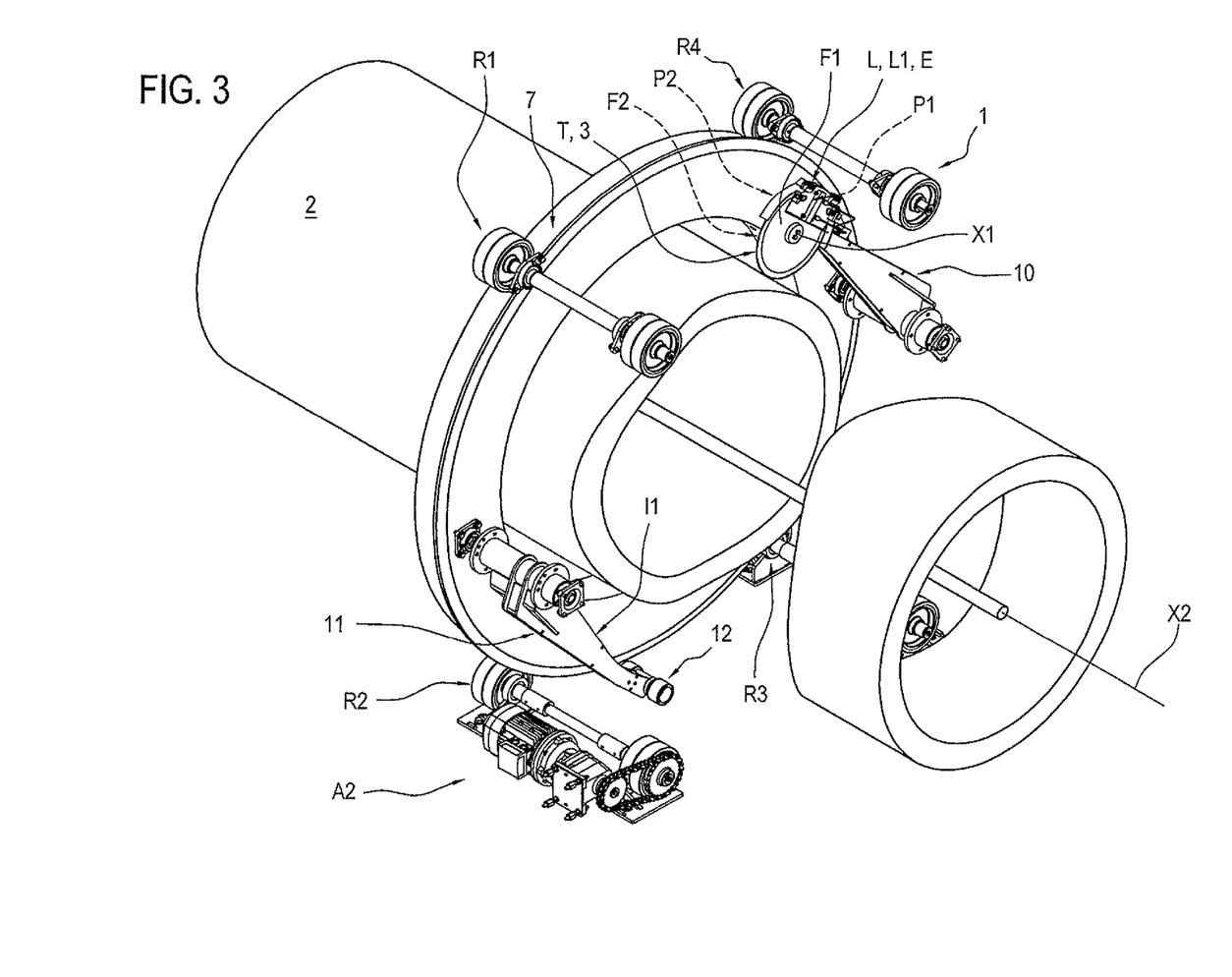
FIG. 3 is a perspective view of the cutting apparatus with some parts cut away to better illustrate others.
Figure 4:
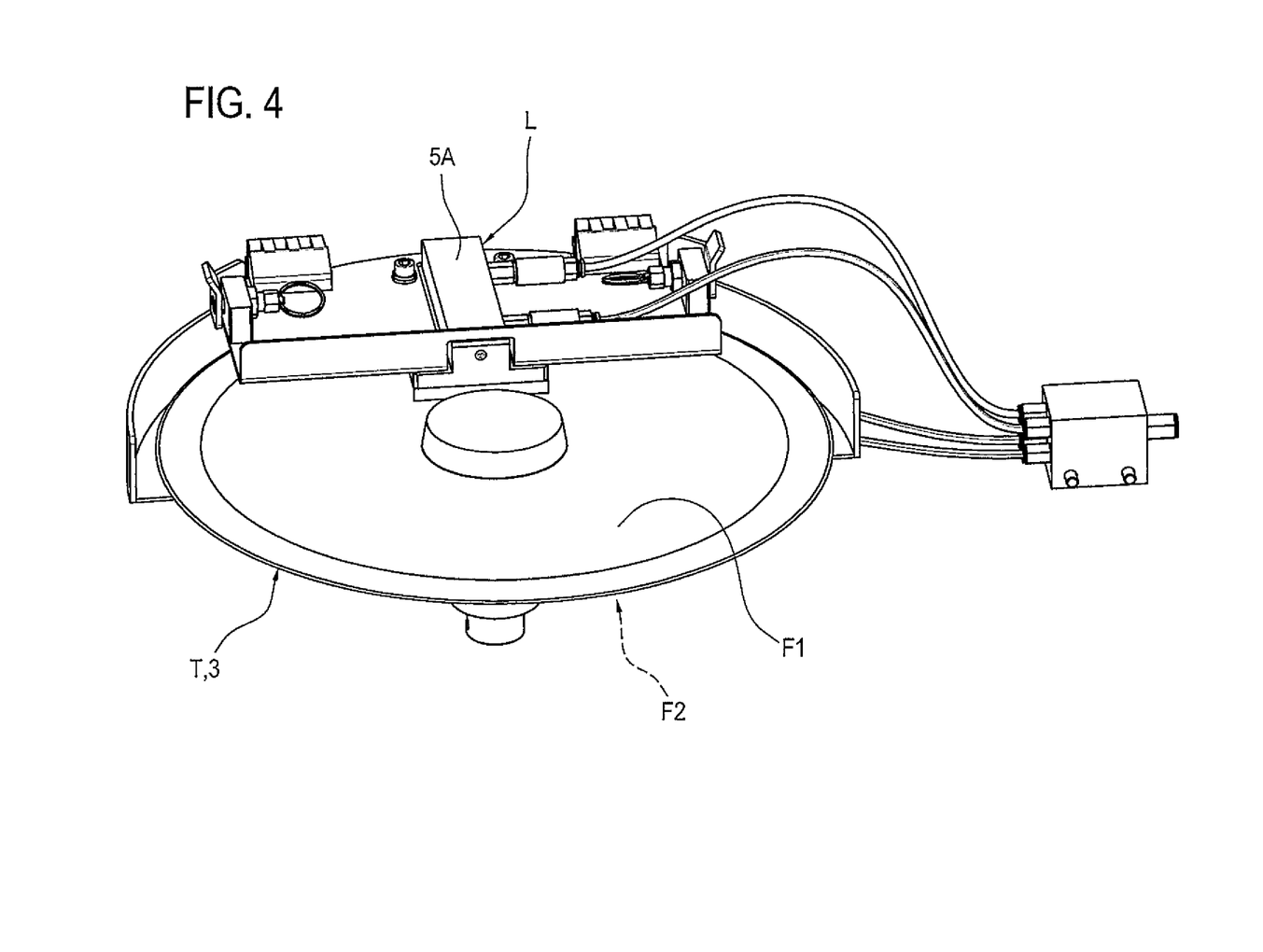
FIGS. 4 to 8 are perspective views of respective details of the cutting apparatus of the preceding figures.
Figure 5:
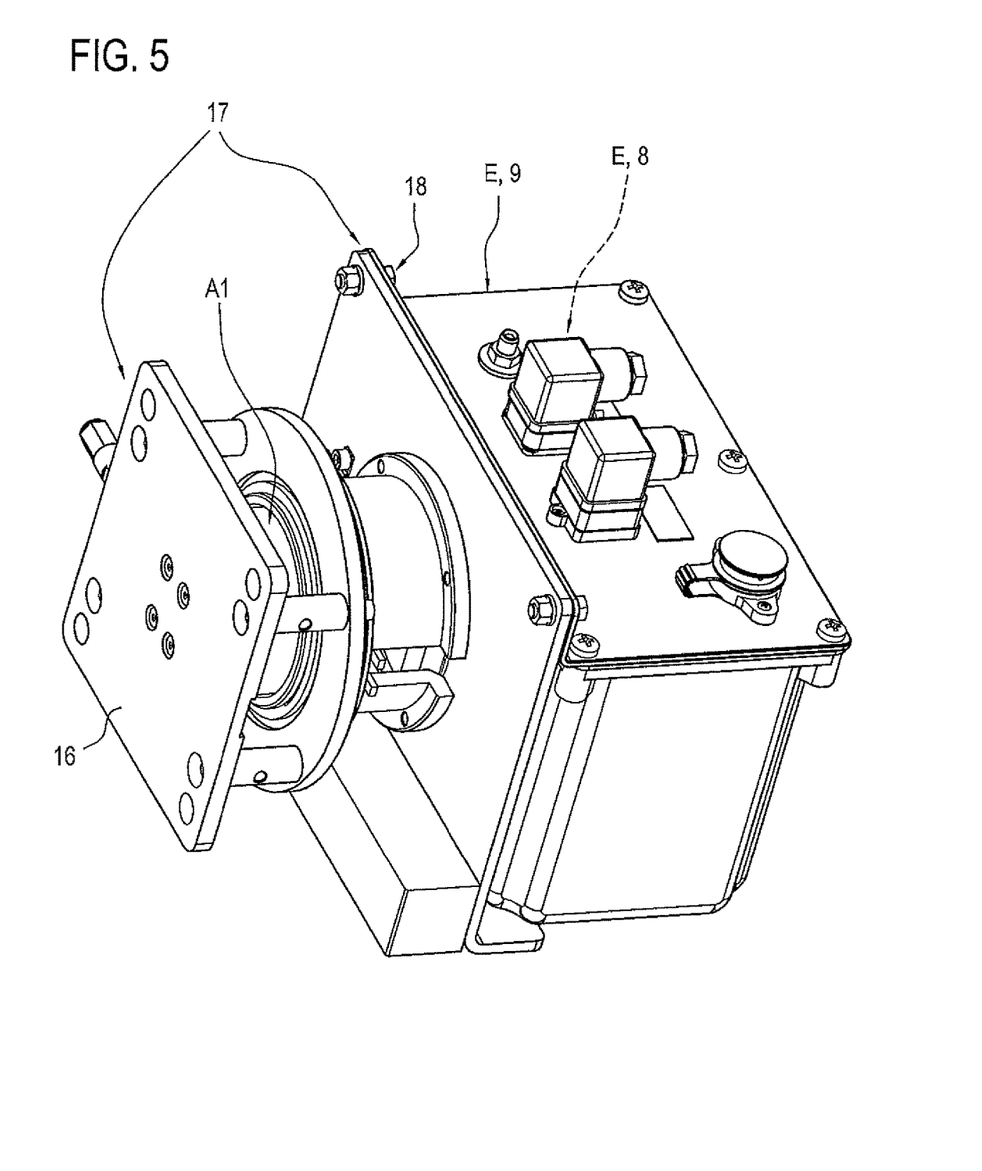
Figure 6:
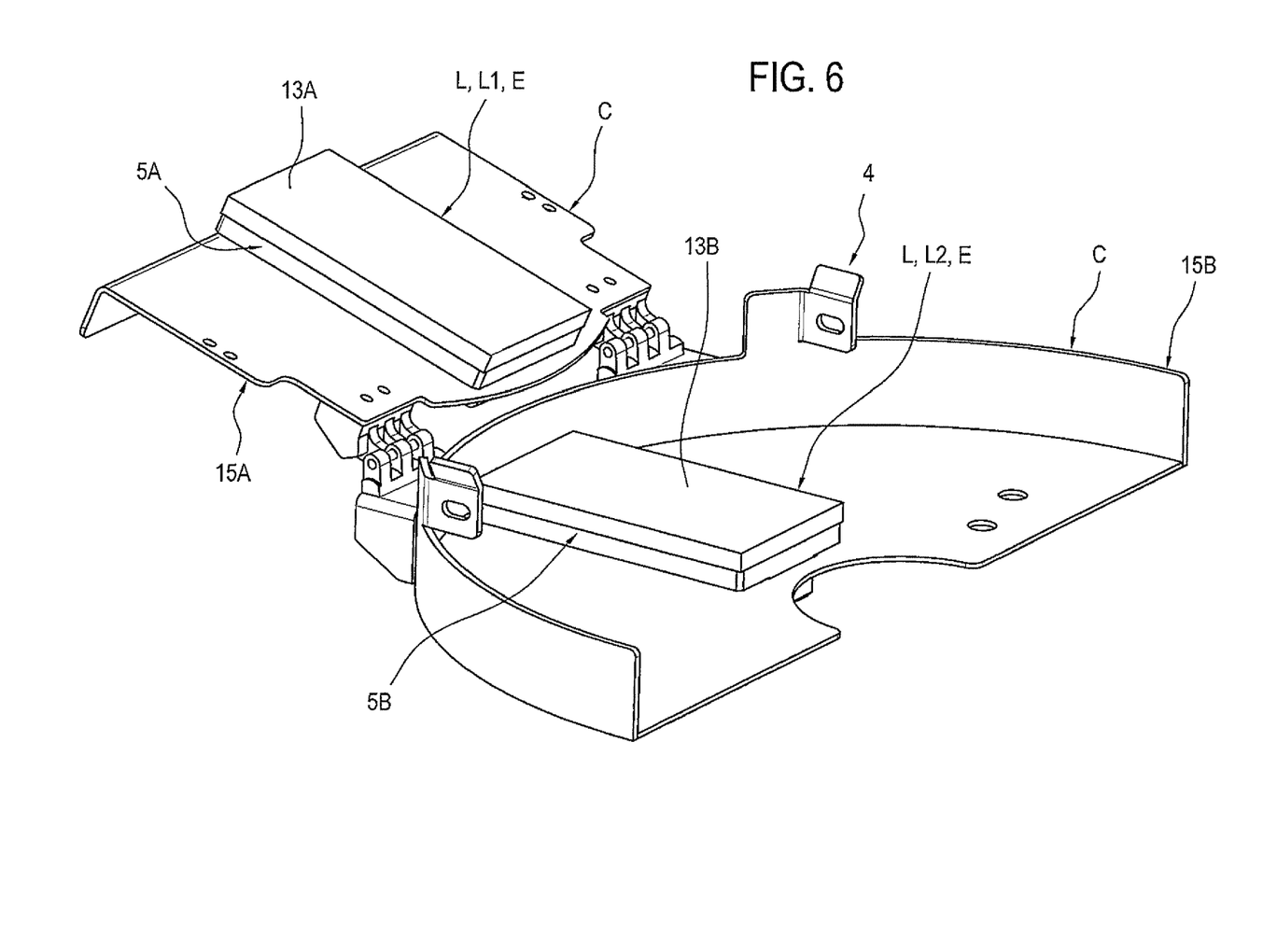

The means E for supplying the fluid lubricant comprise a device 8 for pumping the fluid lubricant and a lubricant collection tank 9, that is to say, a lubricant source 9, to which the pumping device 8 is connected for drawing said fluid lubricant (clearly shown in FIG. 5).

The pumping device 8 is in fluid connection with the distribution elements (5A,5B) to supply to the distribution elements (5A,5B) the fluid lubricant drawn from the source, that is, from the collection tank 9 so that the lubricant is transferred to the disk 3.

More specifically, the pumping device 8 is in fluid connection with the distribution channels 6 through which the fluid lubricant is distributed.

The collection tank 9 is rotatably coupled (by a hinge) to the supporting frame 7.

The apparatus 1 comprises actuator means A1 for driving the rotation at least of the collection tank 9 relative to the supporting frame 7, these actuator means being configured to drive the rotation of the collection tank 9 during rotation of the supporting frame 7 about the axis X2 of the pipe 2, thereby maintaining a predetermined orientation of the collection tank 9.

It should be noted that, according to the foregoing, the collection tank 9 maintains a predetermined orientation relative to the supporting structure of the cutting apparatus 1, so as to keep the fluid lubricant in the same position inside the collection tank 9, irrespective of the angular position of the supporting frame 7 (and thus of the collection tank 9) relative to the axis X2 of the pipe 2.

More specifically, the collection tank 9 and the pumping device 8 are integrated in a structure 17 (shown clearly in FIG. 5).

The structure 17 is fixed to the supporting frame 7 and comprises two portions:
a first portion 16 which, in use, can be fixed to the supporting frame 7;
a second portion 18 which is rotatably connected (by a hinge) to the first portion 16.

The second portion 18 carries the collection tank 9 and the pumping device 8.

The apparatus 1 comprises means (not shown in FIG. 5) for driving the rotation of the second portion 18 relative to the first portion 16.

These rotational drive means allow rotation of the second portion 18 relative to the first portion 16.

The means for driving the rotation of the second portion 18 relative to the first portion 16 comprise, preferably, but not necessarily, electrical and/or hydraulic rotary joints and/or slip rings.

The second portion 18, with all the elements connected to it, rotates relative to the first portion 16.

It should be noted that the supporting frame 7 is carried by a mobile carriage 14 which is movable at least along the direction of extension of the axis X2 of the pipe 2.

Thus, the cutting means T and the lubricating means L are associated with the mobile carriage 14.

The apparatus 1 further comprises means B for locking the pipe 2, associated with the mobile carriage 14, and able to move between a non-interference position and a locked position in which they engage with the pipe 2 in order to constrain the carriage 14 relative to the pipe 2.

The means B for locking the pipe 2 preferably comprise a pair of clamping vices movable between the non-interference position and the locked position.

Preferably, a first clamping vice is positioned to lock the pipe 2 upstream of the cutting plane (that is, of the plane in which the pipe 2 is cut) and a second clamping vice is positioned to lock the pipe 2 downstream of the cutting plane of the pipe 2.

It should be noted that the cutting plane is a plane at right angles to the axis X2 of the pipe 2.

It should also be noted that the cutting apparatus 1 is configured to be installed in a line for the extrusion of a pipe of thermoplastic material.

Also advantageously defined is a thermoplastic pipe extrusion line comprising the cutting apparatus 1 forming the object of this invention.

Below is a description of how the invention works: the example which follows refers to the embodiment described and must not be considered as restrictive but solely for a better understanding of the invention.

FIGS. 10 to 13 illustrate operating steps of cutting a pipe 2.

The rotational actuator means A2 are activated to carry the supporting frame 7 in rotation about the axis X2 of the pipe 2.

It should be noted that the rotation of the supporting frame 7 about the axis X2 of the pipe 2 causes rotation of the axis X1 of the disc 3 about the axis X2 of the pipe 2 and a (simultaneous) rotation of the disk 3 about its own axis X1, by effect of the friction with the pipe 2 when the disk 3 comes into contact with the pipe 2 to be cut.

Also, while the supporting frame 7 rotates about the axis X2 of the pipe 2, the arm 10 is rotated to allow the disk 3 to sink into the wall of the pipe 2.

FIGS. 10 to 13 illustrate the disk 3 with the axis X1 at different positions relative to the axis X2 of the pipe 2 and with the disk 3 sunk into the wall of the pipe 2 to different extents.

More specifically, the supporting frame 7 is carried in rotation in the direction of rotation labelled W.

Advantageously, during rotation about the axis X1, different portions of the faces F1 and F2 of the disk 3 come into contact with the lubricating means L in order to receive the lubricant.

Thus, each portion of a face F1 and F2 of the disk 3 is lubricated when it enters the wall of the disk 3.

Thus, friction between the disk 3 and the wall of the pipe 2 is greatly reduced, thereby allowing optimum cutting of the pipe 2.

It follows that the torque needed to rotate the axis X1 of the disk 3 about the axis X2 of the pipe 2 is greatly reduced.

It should be noted that this lubrication of the disk 3 is preferably continuous lubrication which occurs while the disk 3 rotates about its own axis X1.

It should also be noted that the lubricant is supplied in a quantity such as to prevent it from dripping onto the pipe 2: this advantageously prevents the lubricant from settling on the surface of the pipe 2 or inside the pipe 2. Preventing the pipe from being contaminated with the fluid lubricant is of primary importance because these pipes 2 are usually used to carry drinking water.

Lubrication of the disk 3 is such that friction between the disk 3 and the pipe 2 during cutting is particularly reduced: this advantageously allows the apparatus 1 to cut also pipes with very large diameters and very thick walls without requiring a particularly high torque to drive the actuator means A2.

Furthermore, the lubrication of the disk 3 according to the invention reduces wear of the disk 3, thus increasing the working life of the cutting disk 3 and of the apparatus 1.

In embodiments not illustrated, the lubricating means L are configured to release onto a portion (P1,P2) of one or both of the faces (F1,F2) of the disk 3 a solid lubricant (released in the form of particles).

The solid lubricant may, for example, be graphite.

According to this aspect, therefore, the lubricating means L comprise an element (for example of graphite or other solid material) which, on contact with the disk 3, transfers lubricating particles thereon.

In yet further embodiments not illustrated, the lubricating means L are configured to release onto a portion (P1,P2) of one or both of the faces (F1,F2) of the disk 3 a vaporized or atomized lubricant.

In such an embodiment, therefore, the lubricating means L comprise nozzles designed to spray the fluid lubricant on the disk 3 in the form of a vaporized jet (vapour) or of mist.

It should be noted that these lubricating means L are configured to release onto the disk 3 a quantity of lubricant such as not to drip onto the pipe 2.

An advantage of this invention is that it provides a cutting apparatus 1 which is capable of cutting even a very large diameter and thick-walled pipe 2.

Also defined by the invention is a method for cutting a pipe 2 made of thermoplastic material comprising the following steps:
- preparing a tool with a rotary disk 3 having an axis of rotation X1;
- making the axis of rotation X1 of the disk 3 rotate about the axis X2 of the pipe 2 and feeding the disk 3 into the wall of the pipe 2 in order to cut the pipe 2;
- releasing a predetermined quantity of lubricant on at least one portion (P1,P2) of a face (F1,F2) of the disk 3, for lubricating the disk 3, thereby reducing the friction between the disk 3 and the pipe 2 during cutting.

Preferably, during the step of releasing a predetermined quantity of lubricant, the lubricant is released substantially continuously.

It should be noted that according to the invention, the cutting of the pipe 2 occurs by separation of the material.

The invention claimed is:

1. An apparatus for cutting a pipe made of thermoplastic material, comprising:
    an annular supporting frame for cutting means, wherein a lubricant collection tank is rotatably coupled to the annular supporting frame;
    said cutting means comprising a cutter disk able to rotate about an axis and designed to allow a rotary motion of the axis of the disk about an axis of the pipe and disk sinking into the wall of the pipe;
    lubricating means for the disk, designed to operate on at least one portion of a face of the disk, for releasing a lubricant on the disk so as to reduce the friction between the disk and the pipe during cutting;
    wherein the annular supporting frame rotates about the axis of the pipe so as to allow the rotary motion of the axis of the disk about the axis of the pipe;
    actuator means for driving the rotation of the supporting frame relative to the axis of the pipe; and
    wherein the apparatus comprises actuator means for driving the rotation of the collection tank relative to the supporting frame, said actuator means for driving the rotation of the collection tank being designed to drive the rotation of the collection tank during rotation of the supporting frame about the axis of the pipe.

2. The apparatus according to claim 1, wherein the lubricating means comprise first distribution units, operating on at least one portion of a first face of the disk for lubricating the first face of the disk, and second distribution units, operating on at least one portion of a second face of the disk, which is opposite to the first face, for lubricating the second face of the disk.

3. The apparatus according to claim 1, wherein the lubricating means are designed to release a quantity of lubricant such as to prevent dripping of the lubricant on the pipe on a radial portion of the disk.

4. The apparatus according to claim 1, wherein the lubricating means are designed to release a fluid lubricant on the at least one portion of the face of the disk.

5. The apparatus according to claim 4, wherein the lubricating means comprise at least one distribution unit provided with at least one distribution element which is designed to release a fluid lubricant on said at least one portion of the face of the disk during disk movement.

6. The apparatus according to claim 5, wherein the at least one distribution element comprises a plurality of channels for distributing the fluid lubricant which are designed to allow distribution of the fluid lubricant on the portion of at least one face of the disk.

7. The apparatus according to claim 1, comprising at least one distribution unit comprising an absorbing element designed to absorb a fluid lubricant and to make contact with the portion of the face of the disk for releasing the fluid lubricant during disk movement.

8. The apparatus according to claim 1, comprising:
    the annular supporting frame for the cutting means, designed to be driven to rotate about the axis of the pipe so as to allow the rotary motion of the axis of the disk about the axis of the pipe.

9. The apparatus according to claim 1, wherein the lubricating means comprise means for supplying a fluid lubricant.

10. The apparatus according to claim 9, wherein the means for supplying the fluid lubricant comprise a device for pumping the fluid lubricant and the lubricant collection tank to which the pumping device is connected for drawing said fluid lubricant.

11. The apparatus according to claim 1, further comprising:
    a carriage able to move at least in the direction of extension of the axis of the pipe, with which the cutting means and the lubricating means are associated;
    means for locking the pipe, associated with the carriage, and able to move between a position in which they do not interfere with the pipe and a position in which they lock the pipe, engaging with the pipe to constrain the carriage relative to the pipe.

* * * * *